United States Patent [19]

Heitner et al.

[11] Patent Number: 6,020,418
[45] Date of Patent: *Feb. 1, 2000

[54] MICRODISPERSIONS OF HYDROXAMATED POLYMERS

[75] Inventors: Howard Ivan Heitner, Stamford; Roderick Glyn Ryles, Milford, both of Conn.

[73] Assignee: Cytech Technology Corp., Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/684,277

[22] Filed: Jul. 17, 1996

Related U.S. Application Data

[60] Continuation of application No. 08/421,168, Apr. 13, 1995, abandoned, which is a division of application No. 08/169,782, Dec. 17, 1993, which is a continuation-in-part of application No. 07/704,477, May 23, 1991, abandoned.

[51] Int. Cl.⁷ ..................................................... C08L 41/00
[52] U.S. Cl. ........................ 524/547; 524/555; 525/328.2; 525/328.4; 525/328.5; 525/329.4; 525/374
[58] Field of Search ..................................... 524/547, 555; 525/328.2, 328.4, 328.5, 329.4, 374

[56] References Cited

U.S. PATENT DOCUMENTS

| | | |
|---|---|---|
| 3,622,533 | 11/1971 | O'Connor . |
| 3,753,939 | 8/1973 | Von Euler-Chelpin ............ 260/29.6 Z |
| 4,022,741 | 5/1977 | Tuka et al. . |
| 4,090,992 | 5/1978 | Scanley ............................. 260/29.6 AT |
| 4,151,140 | 4/1979 | Volk et al. . |
| 4,317,758 | 3/1982 | Bruning . |
| 4,393,163 | 7/1983 | Kanda et al. . |
| 4,480,067 | 10/1984 | Vio et al. . |
| 4,521,317 | 6/1985 | Candau et al. ...................... 252/8.55 D |
| 4,581,405 | 4/1986 | Martischius et al. . |
| 4,767,540 | 8/1988 | Spitzer et al. ........................... 210/728 |
| 4,886,872 | 12/1989 | Fong et al. ........................... 525/329.4 |
| 4,902,751 | 2/1990 | Lewellyn et al. . |
| 4,956,399 | 9/1990 | Kozakiewicz . |
| 5,171,782 | 12/1992 | Candau et al. .......................... 524/801 |

FOREIGN PATENT DOCUMENTS

| | | |
|---|---|---|
| 0 314 855 B1 | 9/1992 | European Pat. Off. . |
| 023671 | 4/1965 | Japan . |
| 015915 | 2/1979 | Japan . |
| 045249 | 3/1981 | Japan . |
| 076157 | 4/1985 | Japan . |
| WO 88/06602 | 9/1988 | WIPO . |

*Primary Examiner*—Judy M. Reddick
*Attorney, Agent, or Firm*—Joseph J. Mallon; Frank M. Van Riet

[57] ABSTRACT

Stable, gel-free, water-in-oil microdispersions comprising a continuous phase of an oil and an emulsifier and a discontinuous phase of an aqueous solution of a hydroxamated vinyl polymer are disclosed. Also disclosed is a method for the production of the above-described microdispersions wherein neutralized hydroxylamide and excess base are reacted with a microdispersion of the vinyl polymer.

7 Claims, No Drawings

MICRODISPERSIONS OF HYDROXAMATED POLYMERS

CROSS-REFERENCE TO RELATED APPLICATIONS

This is a continuation of application Ser. No. 08/421,168 filed on Apr. 13, 1995, now abandoned which is in turn a divisional of copending application Ser. No. 08/169,782, filed on Dec. 17, 1993, which in turn, is a continuation-in-part of application Ser. No. 07/704,477 filed May 23, 1991, now abandoned.

BACKGROUND OF THE INVENTION

Polymers containing hydroxamate groups have been known to be particularly useful for the flocculation of red muds produced in the Bayer process, see U.S. Pat. No. 4,767,540. These polymers are generally produced by reacting aqueous solutions of the polymers, e.g. polyacrylamide, with hydroxylamine salts. When the molecular weight of the polymer being hydroxamated is of such a value that the polymer performs at its best in the flocculation application, it has hitherto been in the form of a highly viscous gel. The high viscosity of the gel causes major handling problems both during and after hydroxamation since high viscosity fluids are extremely difficult to transfer from one vessel to another e.g. from reactor to storage, from storage to shipment container and from shipment container to application. The viscosity of such a gel is particularly high when the molecular weight of the polymer is high, i.e. over about 1,000,000.

Furthermore, it is customary for polymers of such high viscosities to be pre-diluted, usually in water, before they are used, so that they may be more easily mixed into the substrate which is to be subjected to flocculation. The high viscosity of hydroxamated polymer gels makes this a difficult process to undertake and often requires the use of specialized and expensive equipment. These inherent limitations in such gels necessarily means that the solids content of such gel products must be kept as low as possible in order to maintain the viscosity at a practical level, i.e. the lower the solids content, the lower the viscosity. The shipment costs of low solids solutions of polymer, however, are significantly higher because of the dilution.

In the case of conventional acrylamide polymers, the viscosity problems have been largely overcome through the development of high solids water-in-oil microdispersions, i.e. such forms as microemulsions, emulsions, microsuspensions, and as used herein, such term is meant to include said forms. As small micelles, the high viscosity polymers, while still being, in effect, gels themselves, are nevertheless, more easily dissolved in the substrates to which they are added in use. Thus, where a polymer solution at high solids is a stiff gel, a microdispersion of the same gel is more easily handled and used due to its lower viscosity.

Attempts have been made to create stable microdispersions of hydroxamated polymers in the past, see U.S. Pat. Nos. 4,587,306; 4,767,540 and 4,868,248. Due to the complexities of performing the hydroxamation reaction in this product form, however, it has not been previously possible to satisfactorily accomplish this goal. The problems attendant such hydroxamation reactions include poor incorporation of the hydroxamate functionality, poor stability of the emulsion, i.e. phase separation after relatively short periods of standing, insolubilization of the polymer, molecular weight degradation etr.

U.S. Pat. No. 4,587,306 to Vio discloses a method for preparing hydroxamated polymer emulsions from polyacrylamide backbones of low molecular weight, e.g. 4000 or below. There is no evidence, however, that the material produced was a true polymer dispersion in oil or, in fact, even an oil-in-water type. It is known that the problem of reacting a polymer backbone with a reagent becomes more acute when the molecular weight of the polymer is high. Attempts to produce, by the method taught in U.S. Pat. No. 4,587,306, both low and high molecular weight, stable, gel-free, water-in-oil hydroxamated polymer emulsions have shown that the incorporation of hydroxamate functionality is much lower (and insignificant) than shown therein for the claimed low molecular weight polymers. Furthermore, at the elevated reaction temperatures thereof, e.g. 70° C., it is very difficult to form a stable emulsion if, in fact one can be formed at all. Indeed, the examples below show that a stable, gel-free high molecular eight, hydroxamated polymer emulsion was not formed under the reaction conditions of this patent at room temperature or at 70° C. Thus, it is clear that the process of the '306 patent is not suitable for the preparation of the microdispersions claimed herein. A further distinction worth noting is that the mole ratio of KOH to hydroxylamine hydrochloride used by the process of U.S. Pat. No. 4,587,306 is only 0.78, i.e. the hydroxylamine is only partially neutralized and the reaction is therefore conducted under acidic conditions which limits the rate of the reaction and necessitates the use of extreme temperatures which further causes the formation of unstable products.

In U.S. Pat. No. 4,767,540 there is disclosed a method for the production of hydroxamated polyacrylamides in which there is proported to be produced a stable emulsion of hydroxamated polyacrylamide. However, attempts to duplicate the procedure of this patent have proven to be less than successful in that the resultant products are not stable, gel-free, water-in-oil microdispersions, see Examples 34 and 35, below.

U.S. Pat. No. 4,868,248 discloses that emulsions of hydroxamated polymers can be produced; however, the patentee fails to disclose any specific example to the production of such a polymer. Both methods described for preparing the polymers thereof are solution-based and no water-in-oil microdispersions are shown.

Accordingly, the search continues for a method for the production of stable, gel-free microdispersions of hydroxamated vinyl polymers, i.e. one in which the structural integrity of the microdispersion remains in tact and is pourable.

SUMMARY OF THE INVENTION

Stable, gel-free microdispersions of hydroxamated vinyl polymers of the water-in-oil type with micelle sizes of the discontinuous phase ranging from about 0.02 to 50 microns and having molecular weights of over about 1,000,000 have been produced. The microdispersions are gel-free and are readily dispersed in water by self-inversion.

By the use of the term "stable, gel-free" microdispersions as used herein, is meant that the microdispersion remains as two distinct phases i.e. continuous and discontinuous phases, after a reasonable period of time e.g. up to about 9 months and is pourable or free flowing. That is to say, a "gel-free" system as referred to herein, is a microdispersion which has not undergone detrimental agglomeration of the micelles of the discontinuous phase such that the microdispersion is not free flowing. Although such a microdispersion may contain gelled polymer, as long as the micelles of gelled polymer are prevented from agglomerating into large detrimental clumps, the microdispersion is still pourable and applicable for its intended use.

Hydroxamated vinyl polymers in microdispersion form are produced by reacting a water-in-oil microdispersion comprising a continuous phase and a discontinuous phase containing a precursor vinyl polymer with neutralized hydroxylamine and, preferably, an excess of base. The process does not require elevated temperatures or extended reaction times, contrary to prior art procedures.

DESCRIPTION OF THE INVENTION

INCLUDING PREFERRED EMBODIMENTS

The instant invention relates to stable, gel-free, water-in-oil microdispersions comprising a continuous phase of a suitable hydrocarbon oil and an emulsifier and a discontinuous phase of an aqueous solution of an hydroxamated vinyl polymer having a molecular weight of over about 1,000,000.

The invention also relates to a method of producing stable, gel-free, water-in-oil microdispersions of hydroxamated vinyl polymers comprising reacting 1) a water-in-oil microdispersion comprising a continuous phase of a suitable hydrocarbon oil and an emulsifier and a discontinuous phase of micelles of an aqueous solution of a precursor vinyl polymer with 2) neutralized hydroxylamine and, preferably, an excess amount of base.

Exemplary of the vinyl polymers useful in the present invention are those which contain a pendant functionality which will react with hydroxylamine, i.e. those produced from acrylic, methacrylic, crotonic acids etc.; acid esters such as methyl acrylate, ethyl acrylate, t-butyl acrylate, and the corresponding methacrylate esters, dimethylaminoethyl methacrylate; dimethylaminoethyl acrylate; and quaternary salts thereof; methyl crotonate, etc.; polymers of maleic anhydride and esters thereof, and the like; nitrile polymers such as those produced from acrylonitrile etc.; amide polymers such as those produced from acrylamide, methacrylamide and the like. Carboxymethylcellulose esters, starch esters, xanthates, etc. may also be used. The polymers may be also crosslinked such as by reaction with a cross-linking agent, e.g. methylenebisacrylamide, divinylglycol, etc.

The above vinyl monomers may also be copolymerized with each other or with any other anionic, cationic or non-ionic monomer, or mixture thereof.

Any emulsifier which is effective such as to provide the proper average diameter of micelles and to prevent the resultant vinyl polymer micelles, which generally range in average diameter size from about 0.02 to about 50 microns, preferably from about 0.1 to about 10 microns, and more preferably from about 0.2 to about 5 microns, from detrimentally agglomerating can be used to prepare the novel compositions hereof. These emulsifiers are such that the microdispersion of the hydroxamated vinyl polymer remains free flowing i.e. does not experience the agglomeration of the gelled polymer solution micelles such that it becomes incapable of flowing e.g. in the worst case scenario, solidified as a gelled mass.

Suitable emulsifiers useful for these purposes in the preparation of such water-in-oil microdispersions of the vinyl polymers to be hydroxamated include the ethoxylated fatty amines; the alkanolamides of fatty acids; imidazole-fatty acid reaction products; alkanolamine-fatty acid condensation products; sorbitan fatty esters, and the like. Suitable emulsifiers should be chosen to result in the formation and maintenance of the polymer micelles ranging in size from about 0.02 to about 50 microns.

It may be advisable to add additional amounts of the same or different emulsifers to the emulsion to be hydroxamated so as to maintain the integrity thereof during the hydroxamation procedure i.e. the emulsion must be kept stable and gel-free during and after the hydroxamation reaction.

The vinyl polymers of the water-in-oil microdispersions e.g. emulsions, claimed herein have weight average molecular weights of at least about 1,000,000, preferably, over 5,000,000 more preferably, over 10,000,000.

Any known hydrocarbon oil may be used in forming the microdispersion of polymers to be hydroxamated including isoparaffinic, normal or cyclic hydrocarbons such as benzene, xylene, toluene, fuel oil, kerosene, odorless mineral spirits, and mixtures thereof.

The ratio of aqueous phase to hydrocarbon phase in the microdispersions should range from about 0.5 to about 3:1, and usually approximates 2:1.

The procedure for forming the precursor vinyl polymer microdispersion is well known in the art and may be obtained from any of the following U.S. patents which leach the production of such microdispersions, i.e. U.S. Pat. Nos. 4,521,317 (Candau) 4,147,681 (Lim) etc.

The precursor microdispersion, and/or the final hydroxamated polymer microdispersion, may be treated to remove water and/or oil by any suitable means, e.g. distillation so as to increase the polymer solids content. The polymer solids content, before or after dehydration may range from about 5% to about 70%, preferably from about 10% to about 60%, based on the total weight of the microdispersion.

The precursor polymer microdispersion is treated with hydroxylamine to hydroxamate the polymer in accordance with the process of the present invention as discussed below. The hydroxylamine is usually employed as a salt and is preferably neutralized with base before or during the hydroxamation reaction.

Suitable hydroxylamine salts include the sulfates, sulfites, phosphates, hydrochlorides, acetates, propionates and the like. The pH of the hydroxylamine solution is adjusted to about 3–14, however, it is preferred that the pH be maintained over about 6.0, and more preferably over about 11.0, by means of the addition of base e.g. NaOH, to the solution.

The degree of hydroxamation, i.e, the concentration of hydroxamate units in the polymers useful herein, may range from about 1 to about 100 mole percent, preferably from about 5 to about 75 mole percent and, most preferably, from about 10 to about 50 mole percent.

The hydroxylamine salt is preferably used in conjunction with an excess (on a molar basis) of base such as potassium hydroxide, sodium hydroxide, ammonia, lime, etc. The preferred base is sodium hydroxide, and preferably more than about 5% molar is used, based on the reactive groups of the precursor polymer.

The hydroxamation reaction may be conducted at low temperature i.e. from about 10° C. to about 90° C., preferably from about 150° C. to about 60° C., more preferably about 15° C.–40° C.

In a preferred embodiment, a stabilizer suitable to stabilize the vinyl polymer against degradation due to the presence of hydroxylamine is added to the hydroxylamine reactant. Suitable stabilizers include water-soluble alkali metal, alkaline earth metal or ammonium thiosulfates; 2-mercaptolhiazoles; 2-mercapthothizolines; thiuram disultides; thioureas; mercaptoalkanols; see U.S. Ser. No. 07/704,475 and U.S. Ser. No. 07/704,479, both filed May 23, 1991 and now U.S. Pat. Nos. 5,227,146 and 5,141,730, respectively.

The hydroxylamine or its salt, excess base and, preferably, the stabilizer is added to and reacted with the precursor vinyl polymer microdispersion in the form of an aqueous solution or as an emulsion. Preferably, the compounds are used in the form of a solution. The emulsion may be formed by adding an aqueous solution of the compounds to any of the oils described above in the presence of an emulsifier such as those disclosed above. The same emulsifier used to form the vinyl polymer microdispersion to be hydroxamated may be used in the formation of the hydroxylamine emulsion charge. A different emulsifier or mixture of emulsifiers may also be used. It is critical, however, that the result of the presence of the emulsifier(s) is such that the hydroxylamine solution goes into the aqueous phase of the precursor microdispersion and the final hydroxamated vinyl polymer dispersion is stable and gel-free, as discussed above. Homogenization of the aqueous solution with the oil and emulsifier is preferred; however, a useful, cruder emulsion may be attained by merely stirring said components. Alternatively, the hydroxylamine solution of hydroxylamine, excess base and stabilizer can be added directly to the precursor vinyl polymer microdispersion to which may be added, additional oil and emulsifier, with stirring as long as the above discussed criteria are met. Still further, each individual component, i.e. the hydroxylamine, the excess base and the stabilizer, rnay be formed into individual emulsions and added as such to the precursor vinyl polymer microdispersion.

The degree of hydroxamation is controlled by the ratio of the added hydroxylamine reagent to the ratio of the precursor vinyl polymer back-bone reactive groups, as is known in the art. The instant method results in a very high conversion of hydroxylamine. The degree of hydroxamation may be determined by carbon 13 Nuclear Magnetic Resonance spectroscopy and is quoted herein in mole percent. The hydroxamated vinyl polymer molecular weights may be determined by ascertaining the viscosity of a dilute polymer solution in molar sodium chloride. The Solution Viscosity (SV), as used herein, is determined on a 0.1%, based on the precursor polymer, polymer solution at 25° C. using a Brookfield viscometer with UL adapter at 30 rpm for SV greater than 10 using the following relationship: $SV = \exp\{ \ln 30 \text{ rpm viscosity} - 0.162 \}$ and at 60 rpm for SV less than 10 and as quoted in mPa.s. Hydroxamated vinyl polymer water-in-oil microdispersions having Solution Viscosities of over about 2.0 can be produced by the process of this invention.

The hydroxamated vinyl polymer water-in-oil microdispersions of this invention can be dissolved directly in water to form aqueous solutions which may be used as, for example, flocculants. Additionally, a breaker emulsifier may be added to the microdispersions or dilution water to which the microdispersion is added to help invert the microdispersion and thereby improve the dissolution characteristics, if necessary or desired. Additionally, the hydroxamated vinyl polymer may be isolated from the microdispersion in the form of a dry powder, such as by precipitation in a non-solvent or by drying.

The following examples are set forth for purposes of illustration only and are not to be construed as limitations on the present invention except as set forth in the appended claims. All parts and percentages are by weight unless otherwise specified.

EXAMPLE 1

(Comparative)

Following the teaching of U.S. Pat. No. 4,587,306 (Vio) a water-in-oil microdispersion of polyacrylamide (molecular weight about 6 million) is treated with hydroxylamine hydrochloride (0.5 equivalent on polyacrylamide) and potassium hydroxide (0.35 equivalent). The microdispersion is prepared by adding 4.7 parts of paraffin oil to a polyacrylamide microdispersion (13.5% solids), made with an ethoxylated octyl phenol emulsifier. The temperature is maintained below 30° C. during the addition. This mixture is then stirred overnight. A sample of the mixture is then heated to 70° C. for six hours. The complete emulsion system gels and the oil phase separates. NMR analysis of the polymer gel shows 5% hydroxamate (10% conversion). A sample of the mixture held at room temperature is stable. This sample shows no hydroxamate by NMR after 5 days. This example shows that Vio's method does not give any incorporation of hydroxylamine at room temperature and only 10% (to give a 5 mole % hydroxamated polymer) at 70° C. At 70° C., the emulsion gels, i.e. it is not a stable, gel-free, dispersion in that the phases separate and the polymer micelles deleteriously agglomerate. This example differs from Vio in that the molecular weight of the precursor microdispersion is much greater ca. 6 million than that of the polymers thereof and as a result shows that, the Vio etal process does not produce useful products when practiced with high molecular weight vinyl polymers.

EXAMPLE 2

(Comparative)

34.6 Parts of a 30% solution of hydroxylamine sulfate are added over 20 min. to 130 parts of a conventional, high molecular weight, inverse polyacrylamide microdispersion containing 45.5 parts of polyacrylamide at room temperature. The mixture is stirred for one half hour. 13.4 Parts of 50% NaOH are added over 20 minutes, i.e. excess over hydroxylamine. The mixture gels due to micelles agglomeration. Similar results are obtained when the microdispersion mixture is homogenized as the NaOH solution is added. This example shows that if the microdispersion is not kept stable and gel-free under the conditions herein, by the addition of more or a second emulsifier, the micelles can agglomerate resulting in a useless product.

EXAMPLE 3

99 Parts of 30% hydroxylamine sulfate solution is combined with 20 parts of sodium thiosulfate stabilizer and the mixture is neutralized with 160 parts of 50% NaOH keeping the temperature below 25° C. The mole ratio of free NaOH to hydroxylamine is 4.5:1. The solution is filtered. An oil phase is made by dissolving 4 parts of ethoxylated fatty amine emulsifier (degree of ethoxylation=5) in 108 parts of hydrocarbon solvent (LOPS). The aqueous solution is homogenized by adding it over 1 minute to the oil phase using a suitable homogenizer to give an emulsion containing 0.0009 mole/part of hydroxylamine. A 52.5 part portion of this emulsion is added at ambient temperature to 50 parts of a polyacrylamide microdispersion (m.w.=10.6 million) made using an isoppropanolamide of a fatty acid as emulsifier and containing 33.8% polymer, by weight. The mole ratio of hydroxylamine to amide is 0.2:1., and the mole ratio of excess NaOH to amide is 0.9:1. The resultant, stable, gel-free microdispersion has a Solution Viscosity of 8.6 mPa.s after 1 week. The polymer contains 16.2% hydroxamate by NMR (81% conversion). This example shows that a stable, gel-free, high molecular weight, hydroxamated polymer microdispersion can be prepared by adding the hydroxylamine reagent in the form of an emulsion.

EXAMPLES 4–11

50% Sodium hydroxide is added to a solution containing hydroxylamine sulfate and sodium thiosulfate stabilizer to give a solution containing hydroxylamine sulfate, sodium thiosulfate and NaOH in a mole ratio of 9.0/2.25/49.5. Sufficient water is added to dissolve all the products of neutralization. Portions of this solution are emulsified with various emulsifiers to give inverse emulsions containing hydroxylamine and excess NaOH. These emulsions are mixed at R.T. with homopolyacrylamide and ammonium acrylate/acrylamide copolymer microdispersions also prepared in the presence of various surfactants, as enumerated. In all cases, the mole ratio of hydroxylamine to amide is 0.2:1. In each instance, a stable, gel-free microdispersion of hydroxamated polymer is recovered. The results are shown in Table I, below. These examples show that the hydroxylamine/ basic compound/stabilizer emulsion which is employed to react with the precursor polyacrylamide microdispersion can be prepared with a variety of different surfactants. Also, the precursor polycrylamide microdispersion may be prepared with different surfactants. Also, the precursor acrylamide polymer may be an anionic copolymer.

TABLE I

| Ex. | Prim. Surf. | (%) | Ha Emul. | (%) | Hydroxamate Mole % | Conversion % |
|---|---|---|---|---|---|---|
| 4 | A | 1% | A | 1% | 17.4 | 87 |
| 5 | A | 1% | B | 2% | 19.1 | 95 |
| 6 | A | 1% | C | 2% | 15.5 | 77 |
| 7 | A | 1% | D | 2% | 16.6 | 83 |
| 8 | A | 1% | E | 2% | 18.1 | 90 |
| 9 | A | 1% | D | 2% | 16.6 | 83 |
| 10 | F | 2.2% | E | 2% | 17.2 | 86 |
| 11 | F | 2.2% | B | 1% | 16.7 | 83 |

For Examples 4–9, a polyacrylamide backbone is used (mw=10.6M).
For Examples 10–11, an anionic polymer backbone prepared from ammonium acrylate (5 mole %) and acrylamide (95 mole %) is used (mw=11. OM).
Prim. Surf.=primary surfactant used to prepare the precursor polymer microdispersion.
Ha Emuls.=surfactant used to prepare the hydroxylamine reagent emulsion.
A=Isopropanolamide of a fatty acid
B=Ethoxylated fatty amine (degree of ethoxylation=5)
C=2-Hydroxyethyl oleylim idazoline
D=The condensation product of diethanolamine and oleic acid
E=An ethoxylated fatty amine (degree of ethoxylation=2)
F=Sorbitan Monooleate

EXAMPLE 12

In a similar manner to Examples 4–11, hydroxylamine sulfate is neutralized with excess sodium hydroxide in the presence of thiosulfate stabilizer. Sufficient water is added to dissolve the reaction products. A water-in-oil emulsion is made by mixing this aqueous solution with a solution of an ethoxylated fatty amine emulsifier (degree of ethoxylation=5) in a paraffin oil without the use of a homogenizer. The resultant emulsion has a bulk viscosity of 73 cps showing that the micelle size of this emulsion is large. At room temperature, a 29.5 part aliquot of this emulsion is added to 20 part portion of a polyacrylamide microdispersion (molecular weight about 12.5 million) containing 33.8% polymer and made using a fatty acid isopropanolamide emulsifier. The resultant stable, gel-free microdispersion has a Solution Viscosity of 11.7 mPa.s and 18% hydroxamate content by NMR (90% conversion).

EXAMPLE 13

In a manner similar to Example 12, an aliquot of the reagent emulsion is homogenized with a homogenizer. The bulk viscosity of the emulsion is 127 cps showing that the micelle size is small. A 29.5 part aliquot of this emulsion is added to the same polyacrylamide backbone microdispersion used in Example 12. The resultant microdispersion is stable, gel-free and has a Solution Viscosity of 13.2 mpa.s and 17.5% hydroxamate content by NMR (85% conversion).

EXAMPLE 14

A mixture of 2.5 parts of an ethoxylated fatty amine emulsifier (degree of ethoxylation=2) and 34.5 parts of a paraffin oil is added to 90 parts of the polyacrylamide microdispersion (mw=12.5M) containing 33.8% polymer of Example 12. 39.5 Parts of 50% sodium hydroxide are added slowly to a mixture of 7.4 parts of hydroxylamine sulfate, 3.6 parts of sodium thiosulfate and 49.5 parts of water, keeping the temperature below 25° C. Over a period of twenty minutes, 95.5 parts of this solution are added with stirring, to the polyacrylamide backbone. After all the hydroxylamine is added, 0.5 part of an ethoxylated nonyl phenol is added over 30 minutes to a 50 part aliquot of the hydroxamated polymer microdispersion. The resultant microdispersion is stable, gel-free and self-inverting in water by inversion (i.e it dissolves readily in water without the use of additional surfactants). It has a Solution Viscosity of 10.8 mPa.s and a hydroxamate content of 17.9% (90% conversion).

EXAMPLE 15

3.3 Parts of hydroxylamine hydrochloride are reacted with 7.45 parts of potassium hydroxide in 18.1 parts of water. (The mole ratio of excess KOH to hydroxylamine in this solution is 1.8:1) 1.0 Part of an ethoxylated fatty amine emulsifier (degree of ethoxylation=2) is dissolved in 10.2 parts of paraffin oil and the mixture added at R.T. to 50 parts of the same polyacrylamide microdispersion described in Example 1. 28.8 Parts of the hydroxylamine/KOH solution are added IO the polyacrylamide giving the same mole ratio of hydroxylamine to amide as in Example 1. The mixture is stirred overnight. A sample of the resultant stable, gel-free microdispersion is heated to 70° C. for six hours. It shows 38.9% hydroxamate content (78% conversion). A sample of the same microdispersion shows 46.2% hydroxamate after 5 days aging at room temperature (92% conversion). This example shows that a stable, gel-free high molecular weight, hydroxamated polymer microdispersion is obtained when the potassium hydroxide is present in excess and when suitable surfactants are employed.

EXAMPLE 16

4.7 Parts of an ethoxylated fatty amine emulsifier (degree of ethoxylation=2) are dissolved in 65.1 parts of paraffin oil and the resultant solution is added to 169.7 parts of the polyacrylamide microdispersion containing 33.8% polymer of Example 12. 50% Sodium hydroxide is added to a solution containing hydroxylamine sulfate and sodium thiosulfate stabilizer to give a solution as in Examples 4–11. This aqueous solution is held at room temperature for 2 hours after the addition of the NaOH. Then, 21.5 parts of this solution are added dropwise at R.T. over one hour, with stirring, to 28.5 parts of the polyacrylamide microdispersion mixture. The mole ratio of hydroxylamine to amide is 0.2:1. The final product is a stable, gel-free polymer microsuspension which is hydroxamated to 21 mole % (100% conversion). The Solution Viscosity (SV) is found to be 12.6 and 11.3 mPa.s (90% retention) after 1 and 13 days aging, respectively, at room temperature, i.e. about 20° C. This example shows that degradation of the polyacrylamide by hydroxylamine can be overcome by use of a suitable stabilizer—in this case, sodium thiosulfate. In this example, the hydroxylamine reagent is added as a solution. Also, this example clearly shows that the stabilizer also reduces loss of molecular weight as indicated by the good retention of Solution Viscosity.

EXAMPLE 17

In the same manner as Example 14, a solution is made containing NaOH and thiourea stabilizer. The mole ratio of hydroxylamine to NaOH to stabilizer is as in Examples 4–11. The solution is held for two hours at room temperature. 21.5 Parts of this solution are then added in the same manner as in Example 4 to 28.5 parts of the same polyacrylamide microdispersion. The resultant product is a stable, gel-free polymer microdispersion which is hydroxamated to 20 mole % (100% conversion) and retains its S.V. over time. This example shows that thiourea can be used as a hydroxylamine stabilizer.

EXAMPLE 18

A solution containing the same levels of hydroxylamine and NaOH as Examples 16 and 17, but containing no stabilizer, is made and held for two hours at 20° C. It is added in the same proportion and at the same rate to the same polymer microdispersion mixture as Examples 16 and 17. The product is a stable, gel-free polymer microdispersion which is hydroxamated to 9.1 mole % (45% conversion). The Solution Viscosity of the polymer is 11.8 and 7.7 (65% retention) mPa.s after 1 and 13 days aging at 20° C., respectively. This example shows that in the absence of a stabilizer, polymer degradation by hydroxylamine occurs when it is stored at room temperature causing a decrease in conversion. Furthermore, in the absence of a stabilizer, the polymer undergoes molecular weight degradation. This is clearly demonstrated by the loss in Solution Viscosity. However, the integrity of the microdispersion remains stable and gel-free.

EXAMPLE 19

An inverse hydroxylamine emulsion containing hydroxylamine and NaOH in the mole ratio of 6.4 to 35.6 is made by emulsifying the solution described in Examples 4–11 with a solution to an ethoxylated fatty amine (degree of ethoxylation=5) in paraffin oil. 30.0 Parts of this emulsion are added at R.T. to 30 parts of an anionic acrylamide polymer (a 30:70 copolymer of ammonium acrylate with acrylamide - molecular weight about 20 million) microdispersion made with sorbitan monooleate and which contains 25.7% polymer. The mole ratio of hydroxylamine to monomer units is 0.20:1 and the mole ratio of free NaOH to monomer units is 0.9:1. The product is a stable, gel-free microdispersion which is 16.5% hydroxamated (82% conversion). The Solution Viscosity is 9.7 mPa.s after 5 days.

EXAMPLE 20

The same hydroxylamine emulsion as described in Example 19 is added at R. T. to an anionic acrylamide-polymer microdispersion. The polymer is a 30:70 (on a molar basis) copolymer of 2-acrylamidomethyl-2-propanesulfonic acid (Na salt) and acrylamide. The mole ratios of hydroxylamine and caustic are the same as in Example 13. The product is a stable, gel-free polymer microdispersion which contains 15.8% hydroxamate (79% conversion). The Solution Viscosity is 7.0 mPa.s after 5 days.

EXAMPLE 21

A cationic polyacrylamide microsuspension is prepared from a mixture of acrylamide (90 mole %) and dimethyidiallylammonium chloride (10 mole %) monomers using standard redox initiated polymerization and an isopropanolamide of a fatty acid emulsifier. The product contains 30.4% polymer based on acrylamide alone. 1.5 Parts of an ethoxylated fatty amine emulsifier (degree of ethoxylation=2) are dissolved in 17 parts of paraffin oil and the mixture added at R.T. to 50 parts of the polymer emulsion. 47.5 Parts of the same hydroxylamine-caustic-thiosulfate solution as in Example 16 are added over 30 minutes to the polymer microdispersion. The product is a stable, gel-free microdispersion which has a Solution Viscosity of 2.8 mPa.s. A sample of the polymer is isolated by precipitation in methanol. The dry polymer contains 14% hydroxamate (70% conversion) and 2% quaternary ammonium groups (20% conversion).

EXAMPLE 22

153.5 Parts of the polyacrylamide microdispersion containing 33.8% polymer of Example 12 are heated under vacuum in order to partially remove water and oil. The polymer solids are increased to 47.4%. 1.5 Parts of an ethoxylated fatty amine emulsifier (degree of ethoxylation= 5) are dissolved in 21.5 parts of paraffin oil. This mixture is added to 40 parts of the partially dehydrated polymer microdispersion. A solution is made up containing the same levels of hydroxylamine, excess NaOH and sodium thiosulfate as in Example 16. 59.5 Parts of this solution are added at R.T. over 25 minutes to the polymer microdispersion. The product is a stable, gel-free polymer microdispersion which has a Solution Viscosity of 11.3 mPa.s after one day and contains 16% hydroxamate (80% conversion). This example shows that the precursor microdispersion may be dehydrated to increase polymer solids prior to reaction with hydroxylamine.

EXAMPLE 23

An inverse microemulsion acrylamide homopolymer is made by polymerizing an aqueous acrylamide solution with an isoparaffin solvent containing and emulsifier mixture of polyoxyethylene sorbitan monooleate and sorbitan monooleate. The polymerization is carried out using a redox initiator system. The microemulsion contains 23% polyacrylamide, by weight, and has an average micelle size of 31 nm. 10.0 Parts of a paraffin solvent are combined with 2.0 parts of an ethoxylated fatty amine emulsifier (degree of ethoxylation=5), 11.2 parts of 50% aqueous sodium hydroxide, 2 parts of 30% aqueous sodium thiosulfate stabilizer and 5.2 parts of 47% aqueous hydroxylamine hydrochloride while stirring and maintaining the mixture at 25° C. This solution is stirred for 20 minutes and then added at R.T. to 29.0 parts of the polyacrylamide microemulsion. The resultant product is a stable, gel-free microemulsion and has a Solution Viscosity of 10.7 mPa.s and a hydroxamate content of 27% (72% conversion). This example shows that the precursor microdispersion may be a microemulsion.

EXAMPLE 24

An inverse emulsion containing hydroxylamine is made by combining 251 parts of 30% hydroxylamine sulfate solution and 37 parts of sodium thiosulfate stabilizer and homogenizing this solution with a mixture of 108 parts of paraffin oil and 4 parts of an isopropanolamide derivative of a long chain fatty acid (emulsifier). A second emulsion is made by emulsifying 50% aqueous sodium hydroxide with a mixture of paraffin oil and an ethoxylated fatty amine emulsifier (degree of ethoxylation=5). 20.7 Parts of the hydroxylamine sulfate emulsion are added over one hour to 29.1 parts of the sodium hydroxide emulsion. The mole ratio of hydroxylamine to NaOH is 5.5:1.0. 22.5 Parts of this mixture are then added to 20 parts of an anionic inverse polyacrylamide (5 mole % carboxylated) microdispersion made with sorbitan monooleate emulsifier. The product is a stable, gel-free microdispersion which has a Solution Viscosity of 10.8 mPa.s after one day and contains 16.2% hydroxamate (81% conversion).

EXAMPLE 25

Following the procedure of Example 24, 8.3 parts of the same hydroxylamine sulfate emulsion thereof are added to 40 parts of the polyacrylamide microdispersion containing 33.8% polymer of Example 12. 42.3 Parts of an inverse emulsion containing sodium hydroxide and sodium thiosulfate stabilizer made with ethcxylated fatty amine emulsifier are then added, over one hour, to the mixture at a ratio of 45:0.16, respectively. The Solution Viscosity of the resultant stable, gel-free polymer emulsion is 5.4 mPa.s after 7 days and the hydroxamate content is 6.4% (64% conversion). Examples 24 and 25 show that the reagent emulsions may be added separately.

EXAMPLE 26

Following Example 3, a water-in-oil emulsion containing neutralized hydroxylamine is made in which the mole ratio of excess NaOH to hydroxylamine is 4.5:1. A 21.7 part portion of this emulsion is mixed with a 50.0 part portion of the same polyacrylamide microdispersion described in Example 1, to give a mole ratio of hydroxylamine to amide of 0.10:1 and a mole ratio of excess NaOH to amide of 0.45:1. The product is a stable, gel-free microdispersion and has a Solution Viscosity of 7.3 after 1 day. The hydroxamate content is 7% by NMR (70% conversion).

EXAMPLE 27

58.3 Parts of hydroxylamine hydrochloride are combined with 116 parts of water and 13 parts of sodium thiosulfate. The mixture is neutralized with 128 parts of 50% NaOH. The solution is filtered and a 288 part portion thereof is emulsified with a solution of 4 parts of an ethoxylated fatty amine (degree of ethoxylation=5) and 108 parts of a paraffin oil to give an emulsion. A 97.0 part portion of this emulsion is mixed with 35.0 parts of the anionic acrylamide polymer microdispersion of Example 19 containing 38% polymer to give a mole ratio of hydroxylamine to amide of 1:1. The product is a stable, gel-free microdispersion. The polymer contains 73.4 mole % hydroxamate by NMR (73% conversion). The Solution Viscosity is 2.9 mPa.s after 6 days. Examples 26 and 27 show that the process may be used to make a polymer containing low and high amounts of hydroxamate, respectively.

EXAMPLE 28

In a manner similar to Examples 4–11, hydroxylamine sulfate is neutralized with excess sodium hydroxide in the presence of sodium thiosulfate stabilizer (25 mole % on hydroxylamine). Sufficient water is added to dissolve the neutralization products. The ratio of excess NaOH to hydroxylamine in this aqueous phase is varied. Inverse water-in-oil emulsions are then made using an ethoxylated fatty amine (degree of the ethoxylation=5) as emulsifier. The concentration of hydroxylamine in the aqueous phase of these hydroxylamine emulsions is kept constant by addition of water. 29.5 Parts of each of the resultant emulsions containing 0.019 part of hydroxylamine are added to 20 part portions of the polyacrylamide microdispersion containing 33.8% polyacrylamide of Example 12 to give a mole ratio of hydroxylamine to amide of 0.20:1. All products are stable, gel- free microdispersions and have the compositions shown in Table 2, below. This example shows that a variety of mole ratios of NaoH/hydroxylamine above 1.0:1.0 may be used to prepare the stable, gel- free microdispersions of the present invention.

TABLE 2

| Example | Polymer Solids | Excess NaOH/ Hydroxylamine Mole Ratio | Hydroxamate Mole % | Conversion % |
|---|---|---|---|---|
| 28a | 13.7 | 4.5 | 18.0 | 90% |
| 28b | 13.7 | 3.0 | 15.6 | 78% |
| 28c | 13.7 | 2.0 | 14.4 | 72% |
| 28d | 13.7 | 0.5 | 12.7 | 63% |
| 28e | 13.7 | 0.25 | 10.6 | 53% |

EXAMPLE 29

A stable, gel-iree hydroxamated polymer microdispersion is prepared according to the procedure shown in Example 3. Its performance in flocculating a suspension of "Red Mud" obtained from an alumina processing plant is compared with that of a commercially available polyacrylate flocculant which is used for that purpose. The results are shown below, in Table 3.

TABLE 3

| Polymer | Dose Grams/Ton | Settling Rate ft/hr | Suspended Solids m#/L |
|---|---|---|---|
| Commercial Polyacrylate | 134 | 37 | 134 |
| Hydroxamated Polymer Micro- dispersion | 80 | 7 | 60 |
| | 107 | 32 | 40 |
| | 134 | 51 | 29 |
| | 160 | 62 | 35 |
| | 188 | 108 | 20 |

This example shows that a stable, gel-free hydroxamated polyacrylamide microdispersion prepared as herein disclosed gives better performance, as demonstrated by the higher settling rate and lower suspended solids, than a conventional polymer in the flocculation of "Red Mud" at equivalent dosages.

EXAMPLE 30

(Comparative)

A polyacrylamide (molecular weight about 4200) is made by polymerizing an aqueous solution of acrylamide. The solution is diluted to 46.1% solids. An oil phase is made by dissolving 8 parts of an ethoxylated octyl phenol, HLB=3.6 (Surfactant G) in 132 parts of kerosene. Using a suitable homogenizer, 260 parts of the polymer solution are added slowly to the oil phase. After 100 seconds of mixing, the homogenizer is increased to #5 for 30 sec. The two phases separate into distinct layers immediately. This example shows that a stable precursor microdispersion cannot be prepared using the specified emulsifier with polyacrylamide solutions.

EXAMPLE 31

(Comparative)

The procedure of Example 30 is repeated, except that 8 parts of an ethoxylated octylphenol (HLB=7.8–Surfactant H), are substituted for Surfactant G. An emulsion forms which separates into distinct phases within 1.5 hours. The procedure is then repeated with an oil phase 16 parts of Surfactant Hans 234 parts of kerosene. The emulsion that forms separates into distinct layers within 2 hours. Again, this example shows that precursor microdispersion of polyacrylamide cannot be made from solutions thereof, even at increased hydrocarbon oil levels.

EXAMPLE 32

(Comparative)

Example 30 is repeated, except that 8 parts of an ethoxylated octylphenol (HBL=10.4–Surfactant 1), are substituted for Surfactant G. A stable polyacrylamide emulsion forms. This emulsion has the same composition as the emulsion in U.S. Pat. No. 4,587,306, Example 27. Conductivity measurements indicate that the oil is the continuous phase. A solution is made of 7.34 parts of hydroxylamine hydrochloride in 22.5 parts of water. Over a period of about 25 minutes, this solution is added to 50 parts of the stirred polymer emulsion made with Surfactant 1. A 50 part aliquot of this emulsion is stirred and 8.07 parts of a 36% solution of KOH are added over a period of about 30 minutes. The mole ratio of KOH to hydroxylamine chloride is 0.78:1, the same as in U.S. Pat. No. 4,587,306 (Vio). A sample of this emulsion is heated in an oven at 70° C. for 7 hours. The phases completely separate after the sixth hour. The polymer aqueous phase of the heated sample contains 0% hydroxamate. Example 32 shows that Vio's method cannot be used to prepare stable inverse microdispersions of hydroxamated low molecular weight polymers. Since Vio did not describe the degree of ethoxylation or the octylphenol emulsifiers therein used with any degree of particularity, a range covering low, intermediate and high HLB emulsifiers are tested in Examples 30–32. None give satisfactory results, i.e. all emulsions separate into separate distinct phases.

EXAMPLE 33

Example 30 is repeated, except that the oil phase is composed of 4 parts of an isopropanolamine amide of oleic acid emulsifier and 136 part of kerosene. A stable inverse polymer microdispersion precursor containing 30% polyacrylamide forms. An inverse emulsion is made containing hydroxylamine and NaOH in a mole ratio of 0.65:3.55 using the same emulsifier. 32.6 Parts of this emulsion are added to a 25 portion of the polymer emulsion. The product is a stable, gel-free inverse emulsion of a hydroxamate polymer. The hydroxamated conversion is 100%.

EXAMPLE 34

(Comparative)

Following the examples of Spitzer U.S. Pat. No. 4,767, 540, 58.2 parts of a commercial acrylic acid/acrylamide copolymer microdispersion (degree of anionicity=3 mole %, molecular weight about 12–15 million) are mixed with 16.3 parts of solid hydroxylamine sulfate such that the hydroxylamine sulfate/amide mole ratio is 1:1. An equimolar amount of 50% sodium hydroxide solution (15.9 parts) is added. The mixture is heated to 90° C. and stirred for 5 hours. It is then placed in a 90° C. oven for 16.5 hours. The non-pourable product is a homogeneous, stiff gel of agglomerated micelles in which the oil is dispersed as an emulsion. The product is soluble in water and has a Solution Viscosity of only 1.4 mPa.s (molecular weight approximately 1 million).

EXAMPLE 35

(Comparative)

The procedure of Example 34 is repeated except that a commercial acrylic acid-acrylamide copolymer dispersion with a degree of anionicity=30% is used as the polymeric reactant. The product is a non-pourable, stiff gel of agglomerated micelles in which the oil is dispersed as an emulsion. It is insoluble in water.

EXAMPLE 36

A cross-linked, inverse, polyacrylamide precursor microdispersion (26% activity) is made by copolymerizing acrylamide with 500 ppm (relative to acrylamide) of divinylglycol using isopropanolamine of a fatty acid as emulsifier. 57.6 Parts of an inverse emulsion, made with the above fatty acid emulsifier, containing the same levels of hydroxylamine, sodium hydroxide and thiosulfate as the emulsion in Examples 4–11 are added to a 50 part aliquot of this precursor emulsion, at room temperature. The resultant product contains 20% hydroxamate (100% conversion) as a stable, gel-free system.

EXAMPLE 37

Following the procedure of Example 14, a microdispersion of a hydroxamated polyacrylamide is prepared. The ethoxylated nonylphenol breaker surfactant is omitted. The hydroxamated polymer is isolated as a dry powder by precipitation in methanol. It has a degree of hydroxamation of 17% (85% conversion). The Solution Viscosity is 4.3 mPa.s.

EXAMPLES 38–43

The procedure of Example 20 is repeated except that the sulfonic acid salt is replaced, as indicated, by: 38) MAPTAC (25%); 39) styrene sulfonic acid (20%); 40) methacrylic acid (48%); 41) carboxymethyl cellulose ester (5%); 42) acrylic acid and methacrylic acid (35%) (5%), respectively; and 43) methacrylic acid and sodium acrylate (20%) (80%), respectively, (no acrylamide used). In each instance, stable, gel-free hydroxamated polymer microdispersions are produced.

*=Methacrylamidopropyltrimethylammonium chloride

We claim:

1. A method of producing a stable, gel-free water-in-oil microdispersion comprising reacting A) a water-in-oil emulsion comprising 1) a continuous phase of a hydrocarbon oil and an emulsifier, and 2) a discontinuous phase comprising micelles of an aqueous solution of a vinyl polymer having a weight average molecular weight over about 1,000,000, with B) neutralized hydroxylamine and at least 0.25 molar excess of base, based on hydroxylamine, wherein said emulsifier is effective to prevent detrimental agglomeration of said micelles.

2. The method of claim 1 wherein the polymer is a polymer of acrylamide.

3. The method of claim 2 wherein B) contains a stabilizer which stabilizes the polymer against degradation due to the presence of hydroxylamine.

4. The method of claim 1 wherein the base is sodium hydroxide.

5. The method of claim 2 wherein the polymer is a copolymer of acrylamide and at least one additional comonomer.

6. The method of claim 5 wherein said additional comonomer is selected from the group consisting of dimethyldiallylammonium chloride, 2-acrylamidomethylpropane sulfonic acid, salts of 2-acrylamidomethylpropane sulfonic acid, (meth)acrylic acid and salts of (meth)acrylic acid.

7. The method of claim 1 wherein the neutralized hydroxylamine and base of B) are in the form of an emulsion.

* * * * *